Oct. 14, 1969　　　W. M. PAGE ET AL　　　3,472,282
CONTROL OF PNEUMATIC CYCLIC GEAR BOXES
Filed Oct. 20, 1967　　　　　　　　　　　　3 Sheets-Sheet 1

INVENTORS
WILBUR MILLS PAGE
RALPH COUPLAND
By: Norris + Bateman, Attys

Oct. 14, 1969   W. M. PAGE ET AL   3,472,282
CONTROL OF PNEUMATIC CYCLIC GEAR BOXES
Filed Oct. 20, 1967   3 Sheets-Sheet 2

INVENTORS
WILBUR MILLS PAGE
RALPH COUPLAND
By Norris Bateman, Atty.

Oct. 14, 1969    W. M. PAGE ET AL    3,472,282
CONTROL OF PNEUMATIC CYCLIC GEAR BOXES
Filed Oct. 20, 1967    3 Sheets-Sheet 3
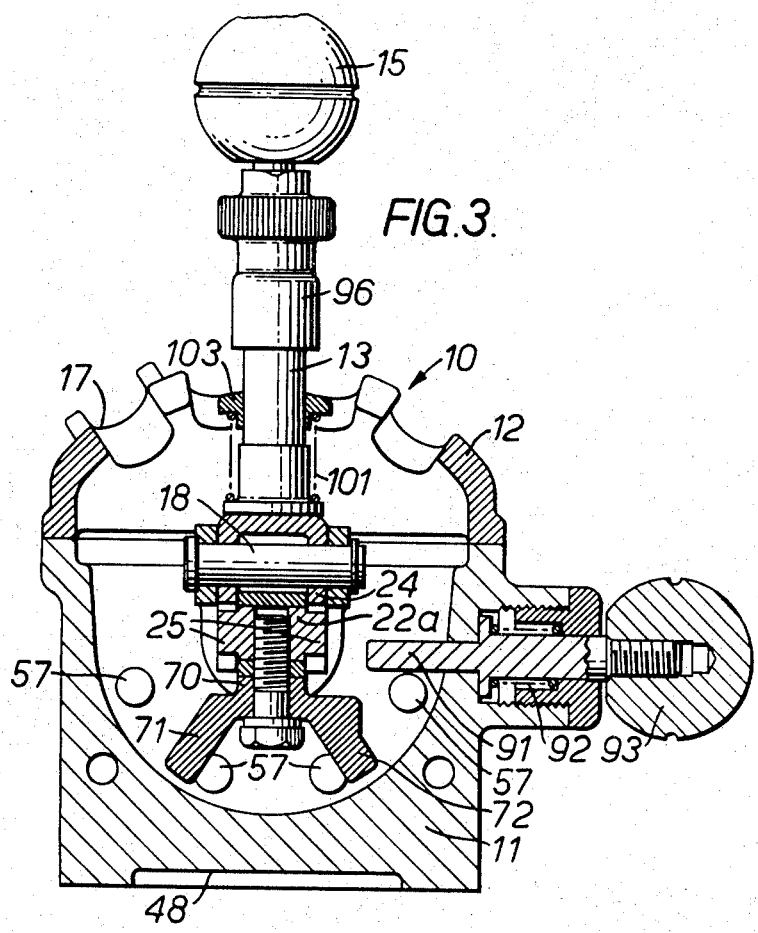
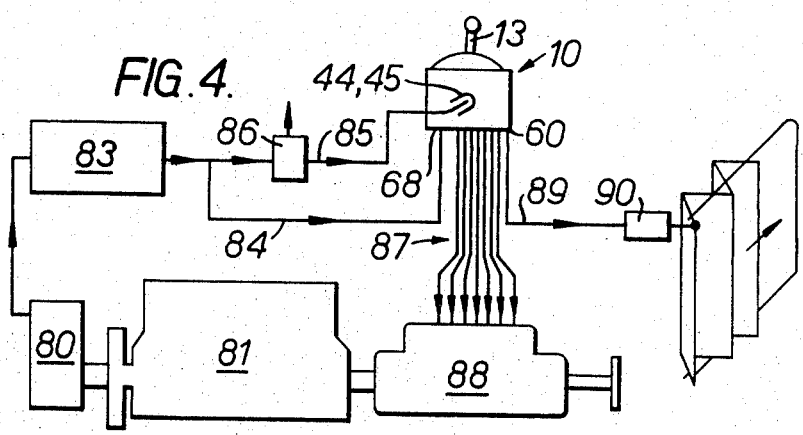
INVENTORS
WILBUR MILLS PAGE
RALPH COUPLAND
By Norris + Bateman, Attys 3,472,282
CONTROL OF PNEUMATIC CYCLIC GEAR BOXES
Wilbur M. Page and Ralph Coupland, Lincoln, England, assignors to Clayton Dewandre Company Limited, Lincoln, England
Filed Oct. 20, 1967, Ser. No. 676,908
Claims priority, application Great Britain, Nov. 16, 1966, 51,348/66
Int. Cl. F16k *11/18;* F16h *5/06;* B60k *33/00*
U.S. Cl. 137—636                           12 Claims

ABSTRACT OF THE DISCLOSURE

A manual control device for a fluid pressure operated gear change mechanism comprises a hand lever movement of which actuates selectively and through a displaceable member a group of valves controlling flow of pressure fluid to the gear speed actuators, said member being acted upon by dual fluid pressure actuaotrs in opposition and which actuators hold the hand lever in a selected position but under control of a low pressure protection valve permit the hand lever to return to neutral position under spring loading upon failure of the pressure supply.

---

This invention relates to the manual control of fluid pressure actuated gear change mechanisms, particularly pneumatic cyclic gear boxes.

According to the invention a manual control device for a fluid pressure actuated gear change mechanism comprises a hand lever movable into a number of different positions to select and operate any one of a group of control valves for controlling the supply of fluid under pressure to respective service outlets to which respective gear speed actuators may be connnected, a member displaceable by the lever on movement thereof from a neutral position to engage operatively any one of said control valves selected by the lever, and dual fluid pressure actuator means which act in opposition on said member in the direction of displacement thereof, the supply of fluid under pressure to said actuator means being controlled in response to movement of the displaceable member so that displacement of said member on movement of the hand lever to select a given said control valve causes actuation of said actuator means in a sense to urge the member towards and hold it in a position in which it engages the selected control valve.

In a preferred embodiment of the invention fluid pressure is supplied to the actuator means through a low pressure protection valve which, in the event of a reduction of the fluid pressure below a predetermined minimum, releases the fluid pressure supply to the actuator means, the displaceable member or the hand lever being spring-biased to a central position corresponding to the neutral position of the hand lever whereby, when the fluid pressure falls below said minimum, the hand lever is automatically returned to or maintained in said neutral position. When the low pressure protection valve has operated the hand lever can still be moved against the spring biassing to effect a gear selection, but it must then be held manually in the selected position.

The dual fluid pressure actuator means may be controlled by respective valve members which are engaged and operated by the displaceable member on movement thereof towards the respective actuator means to connect the latter to an exhaust outlet, so that said movement of the displaceable member is assisted by the other actuator means.

The invention will be more particularly described, by way of example only, with reference to the accompanying drawings, in which:

FIG. 3 is a vertical cross-section taken on the line 3—3 of FIG. 2, and

FIG. 4 is a schematic diagram illustrating the connection of the control device in a fluid pressure operated gear change mechanism of a motor vehicle.

Figure 1:
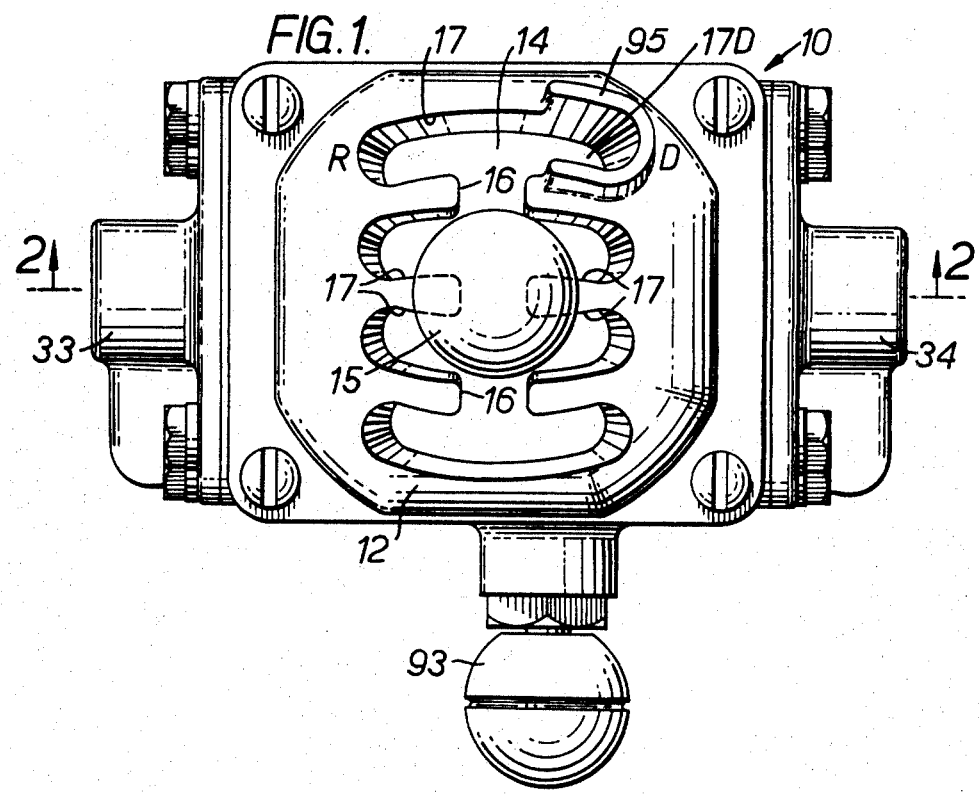
FIG. 1 is a plan view of a control device according to one embodiment of the invention.
Figure 2:
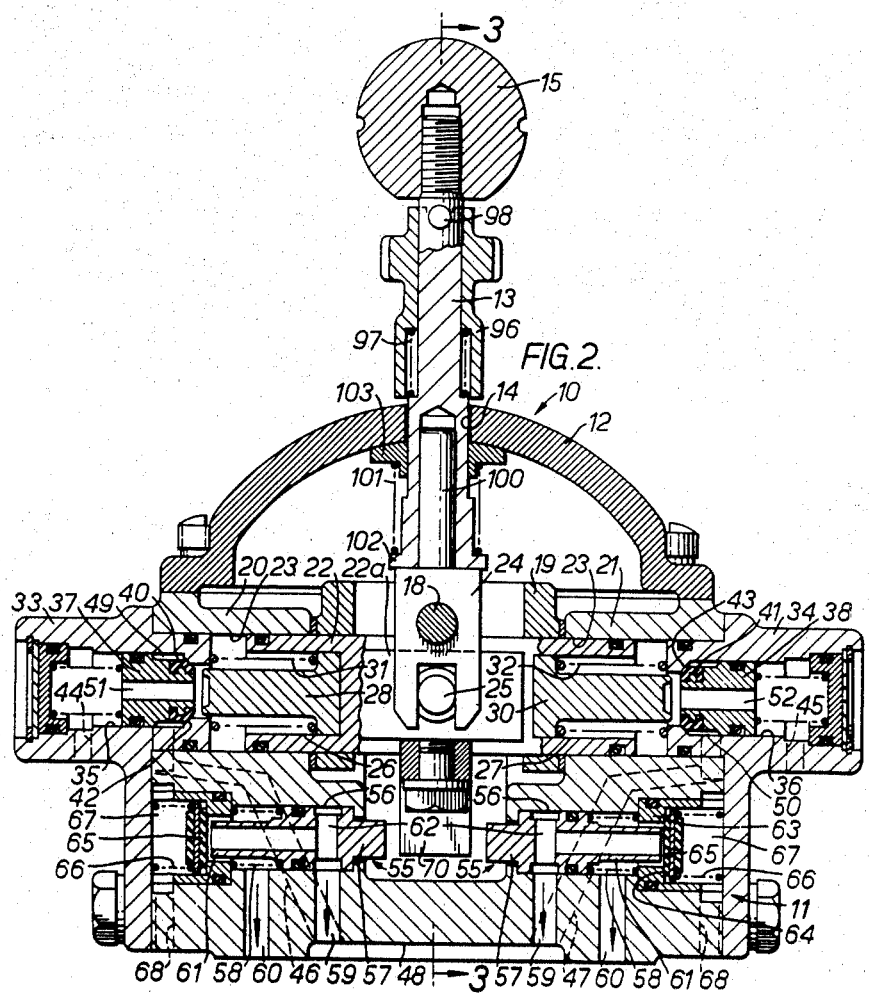
FIG. 2 is a vertical cross-section taken on the line 2—2 of FIG. 1.

Referring to FIGS. 1 to 3, a manual control device 10 for a fluid pressure actuated gear change mechanism has a housing 11 closed on its upper side by a domed cover 12. A gear selection hand lever 13 extends through a slotted gate 14 in the cover 12 in a conventional manner and carries at its upper end a knob 15. The gate 14 comprises a central slot 16 (FIG. 1) defining the neutral position of the lever 13, and a number of branch slots 17 for each respective gear position. In this example there are eight branch slots, defining six forward gear speeds, labelled 1–6, a reverse gear labelled R, and a door-opening setting, labelled D. The hand lever 13 is movable in a first direction along the slot 16 to select a gear then in a second direction perpendicular to the first into a selected slot 17 to effect re-engagement of the selected gear.

Within the cover 12 the hand lever 13 is pivoted about a horizontal pivot pin 18 carried by a trunnion 19 which is located between two internal lands 20, 21 and is slidably mounted on a cross-shaft 22. The cross-shaft 22 extends horizontally in a direction perpendicular to the axis of the pivot pin 18 and is a fluid-tight sliding fit in a cylindrical bore 23 extending through the lands 20, 21 of the housing.

The lever 13 engages the pivot pin 18 in two downwardly depending arms 24 which embrace the cross-shaft 22. The arms 24 are forked at their lower ends to receive respective diametrically opposed pins 25 carried by the cross-shaft 22, so that rocking movement of the lever 13 about the pivot pin 18 causes longitudinal displacement of the cross-shaft 22 from the neutral position in which it is shown in FIG. 2. At each end the cross-shaft 22 has blind axially extending bores 26, 27 which receive respective plungers 28, 30. Respective biassing springs 31, 32 engage the respective plungers 28, 30 to urge the latter into their respective bores 26, 27 and thereby urge the cross-shaft 22 and hand lever 13 into the neutral position shown in FIG. 2. The biassing springs 31, 32 abut at their outer ends annular end walls of respective valve housing 33, 34 which are fitted into and effectively seal the opposite ends of the bore 23 in the housing 11.

The valve housings 33, 34 have respective bores 35, 36 in which respective valve plugs 37, 38 are slidable. At their inner ends the valve plugs 37, 38 carry respective resilient annular inserts 40, 41, each valve plug being spring-urged inwardly to cause its respective insert to engage and seal with a respective frusto-conical valve seat 42, 43 formed at the inner end of the respective bore 35, 36. Outwardly of each valve plug 37, 38 the respective bores 35, 36 are provided with fluid pressure inlets 44, 45, shown, diagrammatically only, in broken outline. Exhaust outlets 46, 47, also shown in broken outline, communicate with the respective bores 35, 36 adjacent the valve seats 42, 43, each outlet 46, 47 leading to an exhaust manifold 48 in the base of the housing 11. Each valve plug 37, 38 also has an annular recessed portion 49, 50 of reduced diameter adjacent its respective insert 40, 41, and an axial bore 51, 52 extending centrally therethrough.

When the cross-shaft 22 and hand lever 13 are in the neutral position shown in FIG. 2 the two valve plugs 37, 38 are held with their inserts 40, 41 in sealing engagement with the respective valve seats 42, 43, so that fluid pressure is applied to the opposite ends of the cross-shaft 22 through the inlets 44, 45 and the bores 51, 52, the outlets 46, 47 being cut off by the engaging inserts 40, 41 and valve seats 42, 43. When the cross-shaft 22 is moved by the lever 13 towards one or the other of the valve plugs 37, 38, the respective plunger 28, 30, after a short displacement of the cross-shaft 22, engages the respective valve plug 37, 38, lifting it off its respective seat and at the same time sealing against the annular insert 40, 41 of the respective plug to close the bore 51, 52 thereof. This has the effect of reducing the effective area of the adjacent end of the cross-shaft 22 which is exposed to the fluid pressure, since the space between the respective plunger 28, 30 and the bore 23 is connected to the respective outlet 46, 47 through the recessed portion 49, 50 of the plunger and an annular clearance between the plunger and the respective valve seat 42, 43. The other valve plug 37, 38 (that is, the plug at the end away from which the cross-shaft 22 has been moved) remains in engagement with its valve seat 42, 43 so that the entire area of the cross-shaft 22 at this end remains exposed to the fluid pressure.

The effect, therefore, of rocking the lever 13 about the pivot pin 18 is to cause a differential fluid pressure to be applied to the cross-shaft 22 in a sense to assist the rocking movement of the lever 13 and move the cross-shaft 22 fully in the desired direction, urging the lever 13 into and maintaining it in the respective slot 17 of the gate 14 corresponding to the selected gear.

At the lower end of the housing 11 are disposed two rows of poppet valves 55, one valve 55 being provided for each slot 17, and each row containing, in this example, four valves 55. Each valve 55 is accommodated in a respective bore 56 in the housing 11 extending parallel to the axis of the cross-shaft 22, and each valve 55 has a head 57 which projects inwardly into the interior of the housing 11 and which is spring-urged inwardly by a respective biasing spring 58. Each bore 56 has two axially spaced ports therein, the inner of which communicates with the exhaust manifold 48 through a drilling 59, and the outer of which communicates with a service inlet duct 60 in the base of the housing 11 which leads to a respective fluid pressure actuator, as described below with reference to FIG. 4.

Each poppet valve 55 has a hollow stem 61 the interior of which in the normal position of the valve (FIG. 2) communicates with the drilling 59 through a side bore 62. At its open outer end the stem 61 passes with an annular clearance through a cylindrical fixed sleeve 63 having an annular outwardly facing shoulder 64. A disc valve 65 is urged by a spring 66 into sealing engagement with the shoulder 64 to seal a chamber 67 disposed outwardly of the washer 65 from the bore 56. A respective fluid pressure inlet, shown diagrammatically in broken lines at 68, communicates with the chamber 67. In the normal positions of the valves 55 the outer ends of the stems 61 are spaced from the disc valves 65.

The cross-shaft 22 has a central portion 22a (FIG. 3) of square cross-section where the shaft 22 passes between the arms 24 of the lever 13, and this portion 22a carries a depending valve actuator member 70 which is forked at its lower end into two angularly separated fingers 71, 72. Rocking movement of the lever 13 about the axis of the cross-shaft 22 (that is, in the plane of FIG. 3) causes rotation of the shaft 22 about its axis, and, therefore movement of the fingers 71, 72 in an arc. The fingers 71, 72 are so arranged in relation to the positions of the valve heads 57 that said rocking movement of the lever 13 about the axis of the cross-shaft 22 causes one or the other of the fingers 71, 72 to be aligned with a respective pair of valve heads 57 when the lever 13 is disposed at the entrance to each respective pair of slots 17. By providing two angularly separated fingers 71, 72 the total angular movement required of the hand lever 11 is less than the total angular extent of the arcs on which the centres of the valve heads 57 on each side of the housing 11 are disposed. Subsequent rocking movement of the lever 11 about the pivot pin 18 (that is, in the plane of FIG. 2) causes said one of the fingers 71, 72 to be brought into engagement with one of the valve heads 57 with which said finger 71, 72 is aligned, depending on which of the slots 17 is engaged by the lever 11, that is, on which gear is selected thereby.

The valve head 57 associated with the selected gear is depressed by the finger 71, 72 against the action of the respective biassing spring 58, causing the outer end of the valve stem 61 to seal against the disc valve 65, effectively sealing off the exhaust manifold 48 from the service outlet duct 60. The disc valve 65 is, moreover, lifted from engagement with the shoulder 64 against the action of its biassing spring 66, so that open communication is thereby provided between the respective fluid pressure inlet 68 and the service outlet duct 60 through the respective chamber 67 and the annular clearance between the valve stem 61 and the sleeve 63. The service outlet ducts 60 of all the remaining valves 55, which remain in their normal positions under the action of the biassing springs 58, 66, communicate with the exhaust manifold 48 through the clearance between the respective valve stems 61 and the disc valves 65, the hollow interiors of the valve stems 61, the side bores 62 and the drillings 59.

The connection of the control device 10 in a pressure fluid circuit is illustrated diagrammatically in FIG. 4. Pressure fluid is supplied to the device 10 in the form of compressed air supplied by a compressor 80 driven by the engine 81 of a motor vehicle in which the device is installed. The compressor 80 delivers compressed air to a reservoir 83 which is connected directly by a line 84 leading to the inlets 68 associated with the respective poppet valves 55. The reservoir 83 is also connected to the two inlets 44, 45 by way of a line 85 containing a low pressure protection valve 86. The valve 86 is pressure-responsive and, when the air pressure falls below a preset minimum, opens to vent the line 85 to atmosphere. This has the immediate effect of releasing the pressure applied to opposite ends of the cross-shaft 22 so that the shaft 22 is returned to the central position shown in FIG. 2 under the action of the springs 31, 32, returning the hand lever 13 to and maintaining it in the neutral position. The valve 86 therefore ensures fail-safe action by putting the gear control in neutral, whatever gear may be selected, if the compressed air supply should fail. Once the valve 86 has opened gear selection can still be made by moving the hand lever 13 against the action of the springs 31, 32 and holding the lever 13 in the selected position.

The service outlet duct 60 of the seven poppet valves 55 associated with the seven gear speeds (six forward and one reverse) are connected via lines 87 to a gear box 88 in the drive transmission of the engine 81, each line 87 being operatively associated with a respective gear change actuator for selecting the respective gear as indicated on the respective gate slot 17. The gear box 88 is of the known pneumatically actuated cyclic type which does not require the use of a clutch in the transmission. The service outlet duct 60 of the remaining poppet valve 55 is connected by a line 89 to a pneumatic door actuator 90 which opens a passenger door of the vehicle when compressed air is supplied to the line 89 by moving the hand lever 13 into the slot 17 labelled D.

The operation of the control device 10 will be apparent from the drawings and the preceding description. A gear speed selection (or selection of door operation) is effected by moving the lever 13 through the slot 16 and then into the appropriate gate slot 17, to cause actuation of the respective poppet valve 55, as described above. As the lever 13 is rocked about the pivot pin 18, a differential pressure is applied to the cross-shaft 22 in an axial direction and in a sense to assist the rocking movement of the lever 13, by selective actuation of the valve plugs 37, 38, as described above, so that the cross-shaft 22 is displaced positively in the required direction under this differential pressure. In this way the selected valve 55 is actuated to its full extent by the actuator member 70 regardless of the manner of operation of the hand lever 13. Once the gear has been selected the differential pressure across the cross-shaft 22 is maintained to hold the actuator member 70 in engagement with the selected poppet valve 55. The respective valve 55 supplies pressure fluid to the respective actuator for the respective gear speed or the vehicle door to maintain the vehicle in the respective gear, or open the door, as the case may be, until the lever 13 is moved by hand out of the respective slot 17 in making the next gear selection, or in returning the lever 13 to neutral.

To avoid accidental selection of reverse gear, which could damage the vehicle transmission if the vehicle were moving forwardly, a retractable stop 91 is provided in the housing 11. The stop 91 extends into the path of movement of the respective finger 72 to prevent this finger 72 engaging the valve head 57 of the poppet valve 55 associated with reverse gear, and the stop 91 is held in this position by a spring 92. To engage reverse gear it is necessary to retract the stop 91 by means of a knob 93 against the action of the spring 92, while moving the gear lever 13 into the appropriate gate slot 17. The operator must therefore use both hands to select reverse gear. On disengaging reverse gear the spring 92 automatically returns the stop 91 to its operative position.

A further safety precaution is provided to avoid inadvertent operation of the door actuator 90. The gate slot 17D associated with the door selection is provided with an upstanding cast baulk 95 around its edge (FIG. 1). The hand lever 13 is provided with an external sleeve 96 which is slidable axially on the lever 13 and urged upwardly by a spring 97 against a stop pin 98. The clearance between the lower edge of the sleeve 96 and the surface of the cover 12 is less than the height of the baulk 95, so that entry of the lever 13 into the slot 17D is prevented. The lever 13 is itself mounted for sliding movement axially on a stem 100 attached to the upper end of the arms 24, the lever 13 being urged downwardly into engagement with the upper ends of the arms 24 by a spring 101 which is in compression between a flange 102 on the lower end of the lever 13 and an annular cap 103 surrounding the lever 13 and held by the spring 101 against the internal surface of the cover 12. To select door operation, it is necessary to lift the lever 13 by means of the knob 15 against the action of the spring 101 until the lower end of the sleeve 96 clears the baulk 95.

In order to lock the hand lever 13 in its neutral position in the gate slot 16 the sleeve 96 is pushed downwardly against the action of the spring 97. The lower end of the sleeve 96 is so shaped that it may enter the gate slot 16 and be retained therein by imparting a half-turn to the sleeve 96 about the lever 13. When so retained the sleeve 96 prevents movement of the lever 13 in the gate 14.

What is claimed is:

1. A manual control device for a fluid pressure actuated gear change mechanism, said device comprising a plurality of control valves for controlling the supply of fluid under pressure to respective service outlets adapted to be connected to respective gear speed actuators, a hand lever movable into a number of different positions, an actuator member displaceable by said lever on movement thereof from a neutral position to operatively engage one of said control valves as selected by the lever movement, dual fluid pressure actuator means mounted to act in opposition on said member in the direction of displacement thereof, and means controlling the supply of fluid under pressure to said actuator means in response to movement of the displaceable member so that displacement of said member on movement of the hand lever to select a given said control valve causes actuation of said actuator means in a sense to urge said member towards and hold it in a position in which it operatively engages the selected control valve.

2. A device according to claim 1, in which said means controlling the supply of fluid under pressure to the actuator means comprises a low pressure protection valve which, in the event of a reduction of the fluid pressure below a predetermined minimum, releases the fluid pressure supply to the actuator means, and said displaceable member being spring-biased toward said neutral position whereby, when the fluid pressure applied to the actuator means falls below said minimum, said member is automatically returned toward and maintained in said neutral position.

3. A device according to claim 1 in which said means for controlling the supply of fluid under pressure to said dual fluid pressure actuator means comprises respective valve members which are engaged and operated by the displaceable member on movement thereof towards the respective actuator means to connect the latter to an exhaust outlet, so that said movement of the displaceable member is assisted by the other actuator means.

4. A device according to claim 3 in which each said valve member comprises a plug which is spring-loaded into sealing engagement with a valve seat and which has a bore therein through which pressure fluid is normally supplied to a space closed by one end of the displaceable member, the plug being engageable by a part of the displaceable member when the latter is moved theretowards so that the bore is sealed to cut off the pressure fluid supply to said space and the valve plug then lifted from its seat to connect the said space to an exhaust outlet.

5. A device according to claim 1 in which the displaceable member comprises a cross-shaft which is displaceable longitudinally by the hand lever on a gear-engaging rocking movement of the latter from its neutral position about a pivot axis perpendicular to the axis of the cross-shaft.

6. A device according to claim 5 in which the hand lever may be moved in its neutral position to different gear selection positions in a gate by rocking movement about the cross-shaft in a plane perpendicular to the axis of the cross-shaft to effect rocking movement of said actuator member relative to operating elements of the control valves so that the actuator member is aligned with a different respective said operating element when the hand lever is disposed at each respective gear selection position.

7. A device according to claim 6 in which the control valves comprise respective spring-loaded poppet valves having operating elements spaced apart along respective arcs on each side of the path of rocking movement of the actuator member about the cross-shaft.

8. A device according to claim 7 in which the operating element of each poppet valve has an open-ended hollow stem through which the respective service outlet is normally connected to an exhaust outlet, and a spring-loaded disc valve co-operating with the open end of the valve stem such that movement of the valve stem by engagement of the actuator member therewith first closes the open end of the stem on to the disc valve to seal off the exhaust outlet from the service outlet and then displaces the disc valve from a respective seating against its spring loading to connect the fluid pressure supply to the service outlet.

9. A device according to claim 6 in which the actuator member comprises two fingers spaced apart angularly in the direction of rocking movement of the actuator member, one or the other of said fingers being arranged to engage the operating element of a selected control valve when the hand lever is moved into a respective slot of a gear selection gate.

10. A device according to claim 1 in which one of the control valves is associated with a reverse gear position and a stop which is releasable by hand and is provided for preventing selection and operation of said one control valve by the hand lever.

11. A device according to claim 1 in which the hand lever is movable in a gear selection gate into respective slots for causing engagement of different respective gear speeds or actuation of different auxiliary actuators, at least one of said slots having a respective raised baulk around its edge, and the hand lever having a portion which may be raised against a spring action and which interferes with said baulk to prevent entry of the lever into the respective slot unless the said portion is so raised.

12. A device according to claim 11 in which the said portion of the hand lever has means engageable with the gear selection gate when the lever is in its neutral position to lock the lever in said position.

References Cited
UNITED STATES PATENTS

| | | | |
|---|---|---|---|
| 2,346,820 | 4/1944 | Casler et al. | 74—335 |
| 2,451,160 | 10/1948 | Eaton | 74—335 |
| 2,671,433 | 3/1954 | Meddock | 137—627.5 |
| 2,931,237 | 4/1960 | Backus | 74—335 |
| 3,068,952 | 12/1962 | Pilkington et al. | 180—113 |
| 2,417,278 | 3/1947 | Van Der Werff | 137—636 X |

MILTON KAUFMAN, Primary Examiner

U.S. Cl. X.R.

74—335; 180—113